E. K. STANDISH.
TRACTOR.
APPLICATION FILED MAY 22, 1920.
1,401,289.
Patented Dec. 27, 1921.
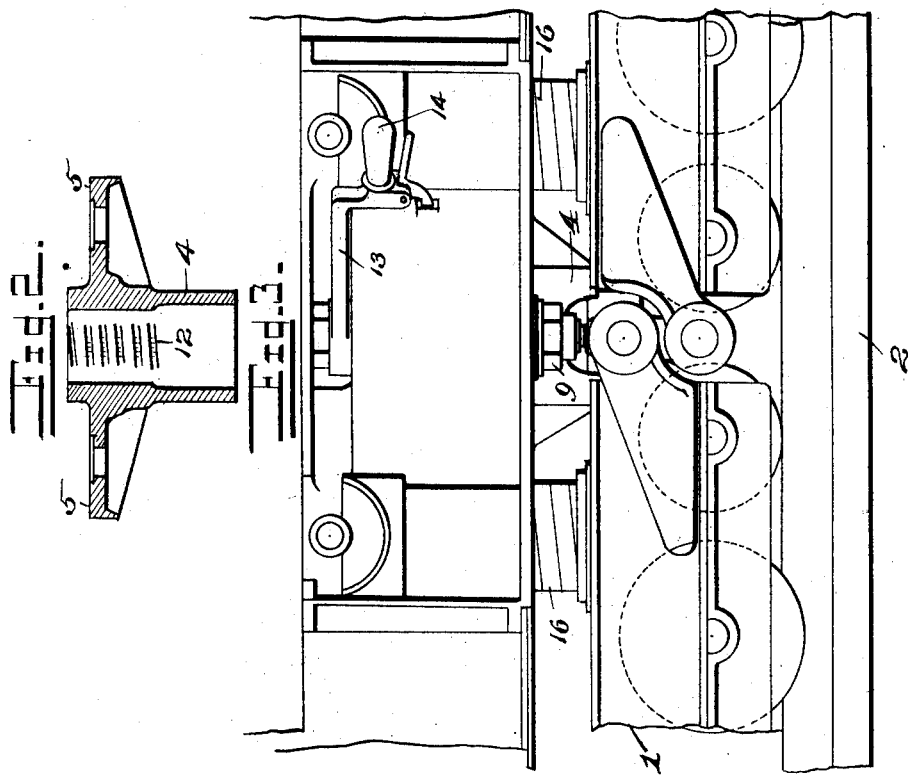
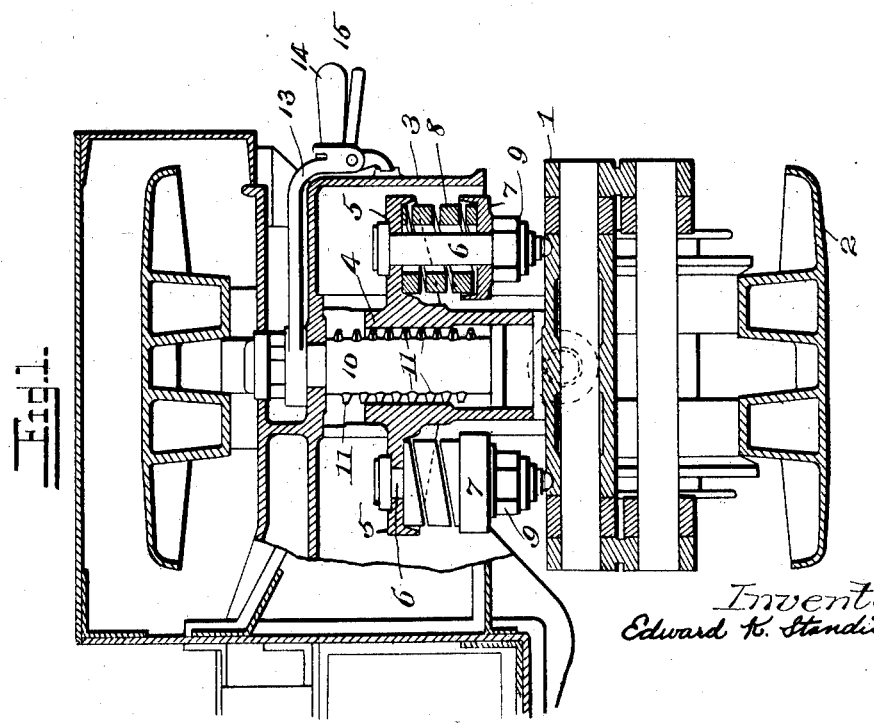
Inventor
Edward K. Standish

UNITED STATES PATENT OFFICE.

EDWARD K. STANDISH, OF STOUGHTON, MASSACHUSETTS.

TRACTOR.

1,401,289. Specification of Letters Patent. Patented Dec. 27, 1921.

Application filed May 22, 1920. Serial No. 383,586.

(FILED UNDER THE ACT OF MARCH 3, 1883, 22 STAT. L., 625.)

*To all whom it may concern:*

Be it known that I, EDWARD K. STANDISH, a citizen of the United States, and a resident of Stoughton, county of Norfolk, State of Massachusetts, have invented an Improvement in Tractors, of which the following is a specification.

The invention described herein may be used by the Government, or any of its officers or employees in prosecution of work for the Government, or by any other person in the United States, without payment to me of any royalty thereon, in accordance with the act of March 3, 1883.

While this invention relates, generally, to tractors, it has more particular reference to means for stabilizing the tractor platform against vibration or oscillation when it is desired, say, to fire a gun, howitzer, or the like, carried by the tractor, or for any other purpose.

A further object is to provide a stabilizing mechanism which can be quickly and easily operated and which will simply, efficiently and positively lock the tractor springs against movement, and irrespective of the vertical location of the tractor treads, and which will also serve as a driving and alining connection between the tractor frame or body and the roller trucks.

With these objects in view, the invention resides, generally stated, in a tractor having the usual main cushioning springs interposed between the truck and the frame or body, and provided with two relatively movable members, interposed between the tractor-body and truck and carried, respectively, by the frame and the truck, and means for locking said members against relative movement in the direction of their length, thus holding the truck and the frame or body against relative movement, and presenting an entirely rigid structure.

The invention, in its preferred form, is clearly shown in the accompanying drawing, which forms part of my specification. Briefly described:

Figure 1 is a transverse sectional view of a portion of a tractor equipped with my improvements;

Fig. 2 is a detail view, in central vertical section, of a tubular member, carried by the truck and constituting one of the elements of my invention; and Fig. 3 is fragmentary view, in side elevation, of a portion of a tractor equipped with my improvements.

Referring, now in detail, to the drawing, 1 designates the truck and 2 the track-shoe, which may be of conventional construction, and which forms no part of my invention. 3 designates a portion of the tractor frame, which may be in the form of a hood as shown.

Supported upon the truck 1 is a tubular member 4, preferably of square external section and circular internal section, the lower end of which is flexibly connected to the truck or frame 1, and tubular member 4, having arms 5, 5, through which slidably project bolts 6, 6 bearing upon the truck 1. Disposed on the bolts 6, 6 are cup-shaped members 7, 7 between which and the arms 5, 5 are springs 8, 8. Nuts 9, 9 threaded on the lower end of the bolts 6, 6 bear against the cup-shaped members 7, 7, this construction allowing the adjustment of the compression on the springs 8, 8 which act to resist side tipping of the frame 1, which may be caused by turning of the tractor.

Telescoping within the tubular member 4 is a member 10 susceptible of an axial turning movement and provided with longitudinally extending series of teeth or projections 11, adapted, upon rotation of the member 10, to engage a series, or a plurality of series, of grooves 12 interiorly of the tubular member 4, thus locking the members 4 and 10 against a rectilinear movement. The member 10 is adapted to be rotated by a crank 13 having a handle 14 and a pivoted latch member 15, whereby the crank may be locked against movement.

The teeth or projections 11 on the member 10 form, in effect, a broken thread screw and may be cut either spirally or in concentric circles and the entering faces of the teeth 11 on members 10 and the projections 12 on the member 4 preferably are sharpened so that engagement of the two members may be easily secured.

The main springs between the truck 1 and the body of the tractor are designated by the numeral 16, as shown in Fig. 3.

In operation, assuming that the rotatable member 10 is in such a position that the teeth 11 thereof are out of mesh with the grooves 12 in the tubular member 4, the tractor body moves up and down with reference to the truck 1 through the medium of the main springs 16, 16 and the supplemental springs 8, 8. Now, when it is desired to stabilize the tractor against vibration, the member 10 is rotated to bring its teeth 11 into mesh with the grooves 12 of the member 4, thus locking the plunger 10 against longitudinal movement with reference to the tubular member 4. It will thus be seen that there is presented a rigid and unyielding structure, so that vibration is impossible.

While the auxiliary springs 8, 8 are not indispensable, their provision and use are desirable, as they coöperate with the main springs 16, 16. The essence of the invention resides in means for locking the truck 1 and the truck-body against relative movement, when desired, for the purpose stated.

Having described my invention, what I claim as new and desire to secure by Letters Patent, is:—

1. A land vehicle comprising a body, a truck, cushioning elements between said body and truck, and means for preventing relative movement of said body and truck on said cushioning elements, comprising telescoping members interposed between and carried, respectively, by said truck and body, one of said members being provided with grooves and the other with pins engageable with said grooves.

2. A land vehicle comprising a body; a truck; cushioning elements between said body and truck; means for preventing relative movement of said body and truck on said cushioning elements, comprising two members interposed between and carried, respectively, by the truck and body, and lockable together against relative movement in the direction of their length; and auxiliary cushioning elements between said truck-carried member and said truck.

3. A land vehicle comprising a body; a truck; cushioning elements between said body and truck; means for preventing relative movement of said body and truck on said cushioning elements, comprising two members interposed between and carried, respectively, by the truck and body, and lockable together against relative movement in the direction of their length; arms carried by said truck-carried member; and auxiliary cushioning elements between said arms and said truck.

EDWARD K. STANDISH.